(12) United States Patent
Hendry et al.

(10) Patent No.: US 7,698,579 B2
(45) Date of Patent: Apr. 13, 2010

(54) MULTIPLEXED GRAPHICS ARCHITECTURE FOR GRAPHICS POWER MANAGEMENT

(75) Inventors: Ian C. Hendry, San Jose, CA (US); Brian D. Howard, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 784 days.

(21) Appl. No.: 11/498,616

(22) Filed: Aug. 3, 2006

(65) Prior Publication Data

US 2008/0034238 A1 Feb. 7, 2008

(51) Int. Cl.
*G06F 1/00* (2006.01)
*G06F 15/16* (2006.01)
*G06F 1/26* (2006.01)
*G06F 1/32* (2006.01)

(52) U.S. Cl. .................. 713/300; 345/502; 713/320

(58) Field of Classification Search ............. 713/300, 713/320; 345/501, 502, 530; 712/220, 228
See application file for complete search history.

(56) References Cited

U.S. PATENT DOCUMENTS

| | | | | |
|---|---|---|---|---|
| 5,438,663 A * | 8/1995 | Matsumoto et al. | ......... | 345/520 |
| 6,864,891 B2 * | 3/2005 | Myers | ......... | 345/502 |
| 7,079,149 B2 * | 7/2006 | Main et al. | ......... | 345/520 |
| 7,100,060 B2 * | 8/2006 | Cai et al. | ......... | 713/320 |
| 7,420,553 B2 * | 9/2008 | Tseng et al. | ......... | 345/213 |
| 7,461,275 B2 * | 12/2008 | Belmont et al. | ......... | 713/300 |
| 2001/0032321 A1 * | 10/2001 | Nanno et al. | ......... | 713/300 |
| 2005/0128205 A1 * | 6/2005 | Chow | ......... | 345/520 |
| 2005/0244131 A1 * | 11/2005 | Uehara | ......... | 386/46 |
| 2005/0285863 A1 * | 12/2005 | Diamond | ......... | 345/519 |
| 2006/0007203 A1 * | 1/2006 | Chen et al. | ......... | 345/204 |
| 2007/0283175 A1 * | 12/2007 | Marinkovic et al. | ......... | 713/320 |

* cited by examiner

*Primary Examiner*—Thomas Lee
*Assistant Examiner*—Brandon Kinsey
(74) *Attorney, Agent, or Firm*—Park, Vaughan & Fleming, LLP

(57) ABSTRACT

A computer system includes a processor, a memory, first and second graphical processors that have different operating characteristics, a switching mechanism coupled to the graphical processors, and a display coupled to the switching mechanism. The switching mechanism is configured to couple a given graphical processor to the display, and is initially configured to couple the first graphical processor to the display. Furthermore, a program module, which is stored in the memory and configured to be executed by the processor, is configured to change a configuration of the switching mechanism thereby decoupling the first graphical processor from the display and coupling the second graphical processor to the display. Note that the changing of the configuration and switching module operations are configured to occur while an operating system is running and are based on the operating condition of the computer system.

19 Claims, 8 Drawing Sheets

MULTIPLEXED GRAPHICS ARCHITECTURE FOR GRAPHICS POWER MANAGEMENT

BACKGROUND

1. Field of the Invention

The present invention relates to power management techniques for computer systems. More specifically, the present invention relates to electronic circuits, processes, and software that facilitate switching between graphics processing units for power management purposes.

2. Related Art

Power management is already critically important for many electronic devices. For example, portable devices such as laptop computers (notebook PCs), cellular telephones, and personal digital assistants need to conserve power in order to operate for any length of time on battery power. Power management is also important for computer systems that directly or indirectly operate on A/C power to meet strict power-usage requirements for ENERGY STAR qualification.

At the same time, many of these electronic devices are beginning to incorporate high-resolution, high-power graphics technology. Rapid developments in this area have led to significant advances in 2D and 3D graphics technology that provides users with increasingly sophisticated visual experiences in everything from graphical user interfaces to realistic gaming environments. Underlying many of these improvements is the development of dedicated graphics-rendering devices, which are also referred to as "graphics processing units" (GPUs). A typical GPU has a highly parallel structure that efficiently manipulates graphical objects by rapidly performing a series of primitive operations and displaying the resulting images on graphical displays.

Unfortunately, there are costs associated with these increased graphics capabilities. In particular, these capabilities can significantly increase power consumption. As a consequence, many computer systems and portable devices devote a significant amount of their power to support these GPUs, which decreases battery life and causes heat dissipation problems.

Furthermore, existing approaches to managing such power consumption issues are often inadequate. For example, many devices are configured to save power by entering a power saving mode of operation (which is also known as "sleep mode" or "stand-by mode") when they are not being used. During sleep mode, unnecessary components (such as the display and disk drive) are powered down to a low-power state. When a power-up or wake-up command is received, the device returns to its former operating status. Unfortunately, many existing GPUs are not configured to conserve power by transitioning to such a low-power mode of operation during "idle" periods. And even when configured to their lowest power state, other GPUs continue to consume significant amounts of power. As a consequence, even when a user is reading a static document on the display the active GPU may be maintained in a high-power state.

To address this problem, one existing laptop computer allows a user to statically configure the computer (by flipping a switch) to select a given GPU prior to booting the device. While this approach allows the user to choose a low-power, low-performance GPU or a high-performance GPU, the user must be able to predict graphical processing needs in advance. Furthermore, in order to change the configuration, the user must reboot the computer. Hence, this technique is unable to accommodate rapid changes in graphical processing needs or power consumption requirements that can occur during system operation.

Hence, what is needed is a GPU power management technique that overcomes the problems listed above.

SUMMARY

One embodiment of the present invention provides a computer system that includes a processor, a memory, first and second graphical processors that have different operating characteristics, a switching mechanism coupled to the graphical processors, and a display coupled to the switching mechanism. The switching mechanism is configured to couple a given graphical processor to the display, and is initially configured to couple the first graphical processor to the display. Furthermore, a program module, which is stored in the memory and configured to be executed by the processor, is configured to change a configuration of the switching mechanism thereby decoupling the first graphical processor from the display and coupling the second graphical processor to the display. Note that the changing of the configuration and switching module operations are configured to occur while an operating system is running and are based on the operating condition of the computer system.

In some embodiments, the program module further includes instructions for a first driver for the first graphical processor and a second driver for the second graphical processor. There are also instructions for changing the configuration of the switching mechanism thereby decoupling the first graphical processor from the display and coupling the second graphical processor to the display. Furthermore, there are instructions for a switching module that, when executed by the processor, sends configuration status requests to the drivers, which cause the corresponding graphical processors to detect the change in the configuration. When the switching module receives the detected change in configuration from the drivers, a display device in the operating system is reconfigured based on the change in configuration.

In some embodiments, the program module further includes instructions for powering down the first graphical processor after decoupling the first graphical processor from the display. Furthermore, in some embodiments the program module further includes instructions for powering up the second graphical processor prior to coupling the second graphical processor to the display. However, in other embodiments the program module further includes instructions for operating the graphical processors concurrently and/or instructions for sending rendering commands to the graphical processors concurrently.

In some embodiments, the graphical processors are provided by different vendors. In addition, in some embodiments the graphical processors consume different amounts of power and/or have different feature sets.

In some embodiments, the decoupling corresponds to a first hot-plug event and the coupling corresponds to a second hot-plug event. Note that in this case a given hot-plug event results from a change in a hardware configuration of the computer system.

In some embodiments, the program module further includes instructions for an application, and the decoupling and coupling are configured to occur while the operating system and the application are running. Moreover, in some embodiments the program module further includes instructions for maintaining the coupling of the display to the first graphical processor if the operating system and/or the application are unable to accommodate dynamic switching from the first graphical processor to the second graphical processor.

In some embodiments, the program module further includes instructions for storing a first display state when the first graphical processor is coupled to the display, and instructions for initializing a second display state based on the stored first display state when the second graphical processor is coupled to the display. And in some embodiments the program module further includes instructions for synchronizing display signals such that graphical output on the display is continuous during the decoupling and the coupling.

In some embodiments, the operating condition includes an external hot-plug event in which a hardware configuration of the computer system is modified (for example, an external display is coupled to the computer system). Furthermore, in some embodiments the operating condition includes a power condition of the computer system, a thermal condition of the computer system, a level of graphical processing activity, and/or a length of a work queue at an input to the first graphical processor.

In some embodiments, the decoupling and coupling are further based on user preferences, physical locations of the graphics processors, format processing capabilities of the graphical processors, and/or other features of the graphical processors that are different.

Another embodiment provides a method of configuring a computer system. Initially, a display is driven using a first driver and a first graphical processor. Next a switching mechanism decouples the first graphical processor from the display and couples a second graphical processor to the display. Then the display is driven using a second driver and the second graphical processor. Note that the decision to switch is based on the operating condition of the computer system and these switching operations occur while the operating system is running in the computer. Furthermore, the driving of the display by the second graphical processor is initiated by sending configuration status requests to the drivers.

Another embodiment provides a computer program product for use in conjunction with a computer system.

BRIEF DESCRIPTION OF THE FIGURES

Note that like reference numerals refer to corresponding parts throughout the drawings.

DETAILED DESCRIPTION

Figure 1:
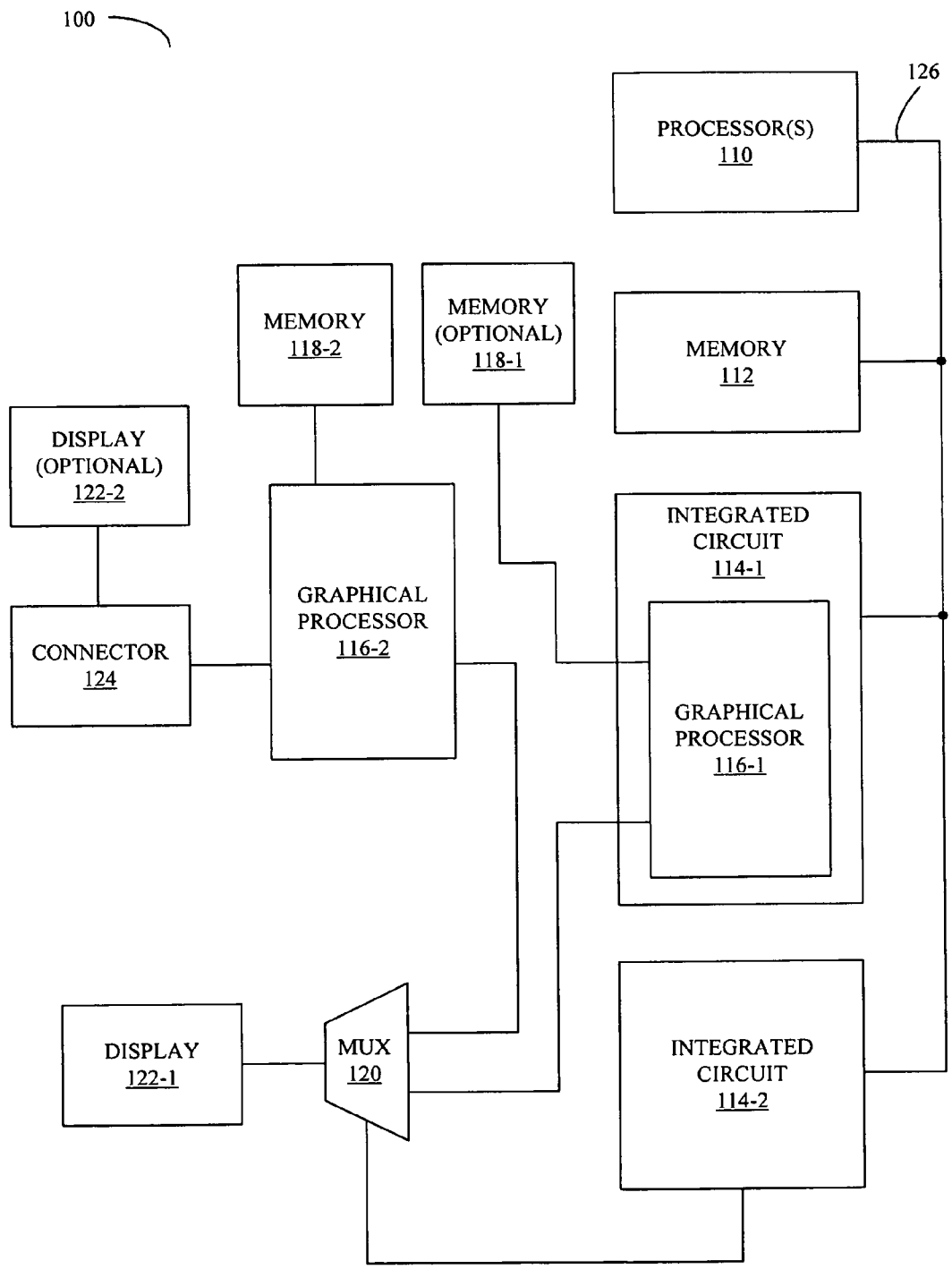
FIG. 1 is a block diagram illustrating a computer system that includes multiple graphical processing units (GPUs) in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of an electronic circuit, a method, and a computer program product (i.e., software) for use in configuring computer systems (such as desktop and laptop computers), as well as portable electronic devices (such as cellular telephones, personal digital assistants, game consoles, and MP3 players) are described. These systems and devices include multiple graphical processing units (GPUs) that have different operating characteristics. In some embodiments, some of the GPUs are provided by different vendors. The electronic circuit, method, and software enable dynamic configuration of the GPUs (for example, for power management), and in particular enable dynamic switching from one GPU to another based on an operating condition of the systems and devices, the processing capabilities of the GPUs, and/or a user preference(s).

Note that the operating condition may include a power condition (such as the availability of AC power or battery power), a thermal condition, a level of graphics processing activity, a length of a work queue at an input to one of the GPUs, and/or an external hot-plug event in which a hardware configuration of the device or computer system is modified (for example, an external display may be coupled to the computer system). Also note that dynamic switching may involve changing the GPU that drives a given display (i.e., changing the configuration) while the operating system is running. Moreover, in some embodiments dynamic switching also involves changing the configuration when the operating system is resident in random access memory (RAM) in one of the devices or systems, during a sleep mode of operation, and/or when an application program is running. However, if the operating system and/or the application is unable to accommodate dynamic switching, the configuration may not be changed (i.e., the GPUs may not be dynamically switched).

In one embodiment, two GPUs are coupled to a switching element (such as a multiplexer), which is coupled to the display. This switching element is configured to couple a given GPU to the display, and initially is configured to couple a first of the two GPUs to the display. When executed, instructions in a program module change the configuration of the switching mechanism, thereby decoupling the first GPU from the display and coupling a second GPU to the display. These instructions may also send configuration status requests (also known as probe commands) to drivers corresponding to the two GPUs. In response to these probe commands, the drivers detect the change in configuration. When reported to the operating system, the detected change in configuration allows a display device in the operating system kernel to be reconfigured based on the change in configuration. This approach leverages existing functionality in some existing operating systems. In particular, from the perspective of the drivers, the decoupling and the coupling are dual hot-plug events that result in the change in the configuration of the computer system or device (i.e., the switching of the GPUs).

Note that the display state and synchronization of drive signals may be maintained during the dynamic switching of the GPUs. In this way, the graphical or video information on the display may be smooth and/or continuous during the decoupling and the coupling (i.e., changes in a frame or field may not be apparent to a user). Also note that the first GPU may be powered down after being decoupled from the display or the two GPUs may be operated concurrently. For example, the second GPU may drive the display and the first GPU may execute rendering instructions for a central processing unit.

We now describe embodiments of a circuit, a method, and software for configuring devices and systems. FIG. 1 provides a block diagram illustrating a computer system 100 that includes multiple graphical processing units (GPUs) 116 in accordance with an embodiment of the present invention. The GPUs 116 may support 2D and/or 3D graphics by performing rendering operations, such as lighting, shading and transforming. Each of the GPUs 116 may have an associated memory 118 to buffer an input to the given GPU, to store intermediate results, and/or to buffer an output from the given GPU from which information to be displayed is read out. In some embodiments, at least one of the GPUs 116 may share memory 112 with one or more of processing units 110.

The GPUs 116 may have different operating characteristics, such as different performance and power characteristics, a different number of color bits, different programmability (including fixed functionality), different format processing capabilities (including video standards such as MPEG, h.263, and/or h.264), different thermal characteristics, different display capabilities (for example, bits/pixel and/or frames/second), different scaling quality when modifying image resolution, and/or different dithering capability (such as temporal dithering). In an exemplary embodiment, GPU 116-1 has a lower power and speed than GPU 116-2. For example, GPU 116-1 may consume 3-6 W and GPU 116-2 may consume 20 W. Furthermore, in some embodiments the GPUs 116 are supplied by different vendors, such as ATI Technologies, Inc., nVIDIA Corporation, or Intel Corporation.

The GPUs 116 are coupled to a multiplexer (MUX) 120, which is coupled to an internal display 122-1 in the computer system 100. Note that the internal display 122-1 and optional external display 122-2 may include a variety of display technologies and formats, including cathode ray tube (CRT) displays, light-emitting diode (LED) displays, liquid-crystal displays (LCD), organic LED (OLED) displays, surface-conduction electron-emitter displays (SED), and/or electric paper.

The multiplexer (MUX) 120 is configured to couple an output video or graphical stream from a given GPU to the display 122-1. The coupling configuration of the multiplexer (MUX) 120 may be changed based on control signals provided by integrated circuit 114-2. (As discussed further below with reference to FIG. 2, in some embodiments software may control the control signals.) In particular, in response to the control signals, the multiplexer (MUX) 120 decouples one of the GPUs 116 from the display 122-1 and couples another of the GPUs 116 to the display 122-1. In an exemplary embodiment, GPU 116-1 is initially coupled to the display 122-1, and subsequently GPU 116-2 is coupled to the display 122-1 (or vice versa). As discussed further below with reference to FIGS. 2 and 3, during the change in GPU configuration a display state (or a closest approximation to the display state or another device state) and synchronization of display signals may be maintained such that video or graphical information on the display 122-1 may be continuous during the decoupling and the coupling of the GPUs 116. However, as discussed below with reference to FIG. 8, in some embodiments it may not be necessary to maintain the synchronization.

The change of in the GPU configuration of the computer system 100 may be based on an operating condition of the computer system 100. For example, the operating condition may include a power condition, such as the availability of AC power or the stored energy remaining in a battery. In some embodiments, the operating condition may include a level of graphical processing activity. For example, if a user is viewing static images or email, the multiplexer (MUX) 120 may selectively couple GPU 116-1 to the display 122-1. Alternatively, if the graphical processing work load is large enough to keep a work queue at an input to GPU 116-1 full during a set time interval (such as 1 minute), the multiplexer (MUX) 120 may selectively couple GPU 116-2 to the display 122-1. Furthermore, the GPU configuration may be changed based on user preferences (a user may choose a setting in a user menu that specifies one of the GPUs 116) and/or the format processing capabilities of the GPUs 116.

However, in some embodiments the GPU 116-2 is coupled to the optional external display 122-2 via a connector 124. In these embodiments, GPU 116-2 provides the output video or graphical stream to the optional external display 122-2. Thus, in some embodiments the operating condition may detect an external hot-plug event in which a hardware configuration of the computer system 100 is modified, and in particular, when the optional external display 122-2 is coupled to the computer system 100. If such a hot-plug event occurs and the computer system 100 is instructed to use the optional external display 122-2, the GPU 116-2 may be selected to provide the necessary output video or graphical stream.

As illustrated in the computer system 100, GPU 116-1 is internal to or embedded in integrated circuit 114-1 and GPU 116-2 is a discrete component. The integrated circuits 114 may include any type of core logic unit, bridge chip, and/or chipset that are commonly used to perform logic functions and couple components within an electronic device, such as the computing system 100. In exemplary embodiment, integrated circuit 114-1 is a so-called northbridge chipset and integrated circuit 114-2 is a so-called southbridge chipset, both of which are used in computer systems provided by Apple Computer, Inc. The northbridge chipset may include high-speed I/O and the southbridge chipset may include low-speed I/O to communicate with disk drives, USB ports, and/or devices with GPIO interfaces.

The computer system 100 also includes the one or more processors 110 (such as CPUs), which are coupled to memory 112 and the integrated circuits 114 via one or more signal lines 126. The processors 110 and the memory 112 are discussed further below with reference to FIG. 2.

While the computer system 100 is used as an illustration in FIG. 1, in other embodiments the power management techniques described below may be applied to a variety of electronic devices (including portable and stationary devices, as well as devices that are battery powered and/or AC powered) that include two or more GPUs 116. However, note that the approach described herein is general and may be used to dynamically configure electronic devices for a variety of reasons in addition to power management. Also note that in some embodiments, the computer system 100 includes fewer or additional components, two or more components are combined into a single component, and/or a position of one or more components may be changed. For example, in some embodiments both GPUs 116 are selectively coupled to the optional external display 122-2 via a second multiplexer (MUX).

Figure 2:
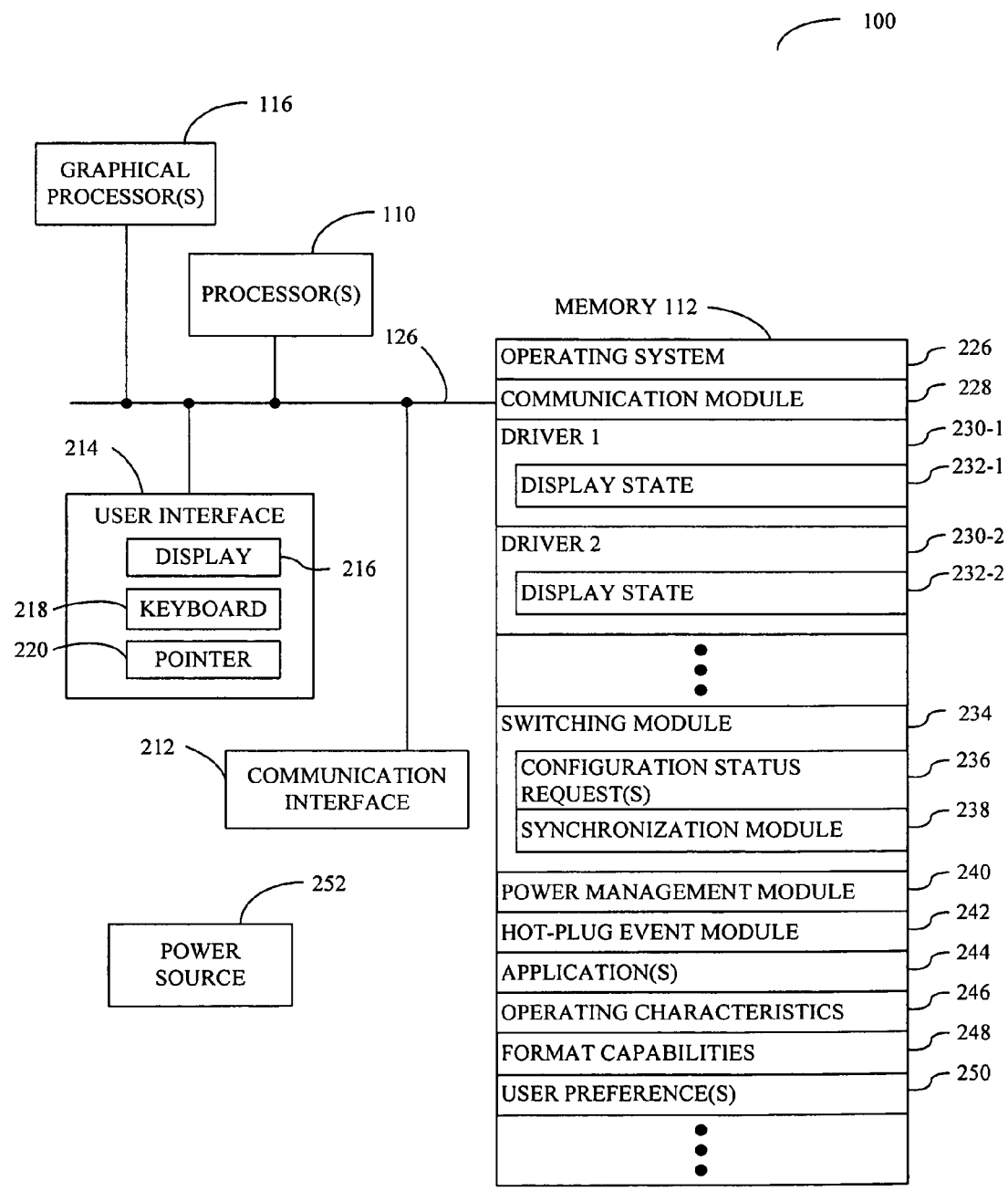
FIG. 2 is a block diagram illustrating the computer system that includes multiple GPUs in accordance with an embodiment of the present invention.

FIG. 2 provides a block diagram illustrating the computer system 100 that includes multiple GPUs 116 in accordance with an embodiment of the present invention. The computer system 100 includes the one or more processors 110, a communication interface 212, a user interface 214, and the one or more signal lines 126 coupling these components together. The computer system 100 also includes a power source 252, such as an AC transformer and/or a battery. For simplicity, GPUs 116 are illustrated, but additional components, such as the integrated circuits 114 (FIG. 1), the multiplexer (MUX) 120 (FIG. 1), and the displays 122 (FIG. 1), are not shown. Note that the one or more processing units 110 may support parallel processing and/or multi-threaded operation, the communication interface 212 may have a persistent communication connection, and the one or more signal lines 126 may constitute a communication bus. Moreover, the user interface 214 may include a display 216, a keyboard 218, and/or a pointer 220, such as a mouse.

Memory 112 in the computer system 100 may include high speed random access memory and/or non-volatile memory. More specifically, memory 112 may include ROM, RAM, EPROM, EEPROM, FLASH, one or more smart cards, one or more magnetic disc storage devices, and/or one or more optical storage devices. Memory 112 may store an operating system 226, such as SOLARIS, LINUX, UNIX, OS X, or WINDOWS, that includes procedures (or a set of instructions) for handling various basic system services for performing hardware dependent tasks. The memory 112 may also store procedures (or a set of instructions) in a communication module 228. The communication procedures may be used for communicating with one or more computers and/or servers, including computers and/or servers that are remotely located with respect to the computer system 100.

Memory 112 may also include multiple program modules (or a set of instructions), including drivers (or a set of instructions) 230, switching module (or a set of instructions) 234, power management module (or a set of instructions) 240, and/or hot-plug event module (or a set of instructions) 242. A respective driver, such as driver 230-1, may correspond to one of the GPUs 116. Each of the drivers 230 may also include display state 232. In addition, the hot-plug event module 242 may detect a change in the hardware configuration, such as when the optional external display 122-2 (FIG. 1) is coupled to the computer system 100.

The power management module 240 may detect or determine the operating condition of the computer system 100. In response to this operating condition, the switching module 234 may change the GPU 116 that drives the display 122-1 in FIG. 1. (For example, note that in some embodiments the current GPU configuration may be selected to obtain the fastest performance with the lowest power consumption based on the existing video or graphical demand). This change may include providing the control signals to the multiplexer (MUX) 120 (FIG. 1) via the integrated circuit 114-2. Additional instructions in the switching module 234 may result in the operating system 226 being notified of the change. Then the operating system 226 may select the appropriate driver 230 and rebuild a corresponding display device in the operating system kernel in order to send rendering commands to the GPU that is now coupled to the display 122-1 (FIG. 1).

In an exemplary embodiment the switching module 234 may include instructions for configuration status requests 236, which are also referred to as probe commands. The configuration status requests 236 are provided to the drivers 230 corresponding to the GPUs 116 that are switched using the multiplexer (MUX) 120 (FIG. 1). In response to receiving one of the configuration status requests 236, each of the drivers 230 detects the change in the GPU configuration, i.e., that the corresponding GPU is now decoupled or coupled from the display 122-1 (FIG. 1). The drivers 230 report the detected change in the GPU configuration to the operating system 226, which then rebuilds the display device in the operating system kernel. Thus, this approach enables dynamic switching of the GPUs 116 while the operating system 226 is running (i.e., without rebooting), while the operating system 226 is resident in RAM in the memory 112, and/or during a sleep mode of operation.

This approach also leverages commands that are included in some existing operating systems. In particular, the approach mimics dual hot-plug events, in which one of the drivers 230 determines that a corresponding one of the GPUs 116 is decoupled from the display 122-1 (FIG. 1) and another of the driver 230 determines that the other of the GPUs 116 is coupled to the display 122-1 (FIG. 1). As described above, these dual hot-plug events may result from a change in the hardware (GPU) configuration and, in turn, the hot-plug events may result in a change in a software configuration of the computer system 100.

In some embodiments, synchronization module 238 (or a set of instructions) maintains the display state and synchronization of drive signals while the GPU configuration is changed. One or both or these operations may ensure that the graphical or video information on the display 122-1 (FIG. 1) is smooth and/or continuous during the decoupling and the coupling (i.e., there may not be a discontinuous modification of the displayed information due to the change in the GPU configuration). For example, a display state (including the screen brightness, color correction, and/or display mode) prior to the change may be stored (for example, in display state 232-1) and may be reinitialized (for example, in display state 232-2) after the change.

Synchronization typically involves aligning both clock and data (such as horizontal and vertical synchronization pulses) in the output signals provided by the GPUs 116. For example, synchronization may occur during a vertical blanking interval of the display 122-1 (FIG. 1) or at other times by using addition hardware (not shown) to match the clock and data signals in the output signals from the GPUs 116. Note that in order to synchronize the GPUs 116, the 'new' GPU that will be coupled to the display 122-1 (FIG. 1) is powered on prior to the change in the GPU configuration. As noted previously and illustrated below with reference to FIG. 8, by appropriately fading out the display (for example, using the display backlight), in some embodiments synchronization may not be necessary.

After the GPU configuration has been changed, the 'old' or previous GPU that was coupled to the display 122-1 (FIG. 1) may be powered down. In an exemplary embodiment, this occurs between 0.5 and 1 s after the change in the GPU configuration. However, in other embodiments both GPUs 116 may remain powered even though only one of them is coupled to the display 122-1 (FIG. 1) at a given time. In these embodiments, the GPUs 116 may be operated concurrently. For example, one of the GPUs 116 may drive the display 122-1 (FIG. 1) and the other may execute rendering instructions for one of the processors 110. In this case, the other GPU may perform image processing for one of the processors 110 and the results may be stored in the memory 112.

In some embodiments, memory 112 includes one or more application programs (or sets of instructions) 244. In some embodiments, the change in the GPU configuration, i.e., the decoupling and coupling instructions in the switching module 234, is configured to occur while the operating system 226 and at least one of the application programs 244 are running. However, note that if an application and/or the operating system 226 is unable to accommodate dynamic switching, in some embodiments the GPU configuration may not be changed (i.e., the GPUs may not be dynamically switched).

Memory 112 may also include operating characteristics 246 and format processing capabilities 248 of the GPUs 116, as well as user preference(s) 250. In some embodiments, this information is used by the power management module 240 when determining whether or not to change the GPU configuration.

Instructions in the various modules in the memory 112 may be implemented in a high-level procedural language, an object-oriented programming language, and/or in an assembly or machine language. The programming language may be compiled or interpreted, i.e, configurable or configured to be executed by the one or more processing units 110 and/or GPUs 116.

Although the computer system 100 is illustrated as having a number of discrete items, FIG. 2 is intended to be a functional description of the various features that may be present in the computer system 100 rather than as a structural schematic of the embodiments described herein. In practice, and as recognized by those of ordinary skill in the art, the functions of the computer system 100 may be distributed over a large number of servers or computers, with various groups of the servers or computers performing particular subsets of the functions. In some embodiments, some or all of the functionality of the computer system 100 may be implemented in one or more ASICs and/or one or more digital signal processors DSPs.

The computer system 100 may include fewer components or additional components, two or more components may be combined into a single component, and/or a position of one or more components may be changed. For example, in some embodiments there may be a single display driver for the GPUs 116.

In some embodiments the functionality of the computer system 100 may be implemented more in hardware and less in software, or less in hardware and more in software, as is known in the art. In particular, the preceding embodiments extract control of the switching from ownership of the hardware (there are two GPUs and separate handshaking to control the switching and reconfiguration). In embodiments with a common display driver for the GPUs 116 there may be different modes of operation for power savings as opposed to rebuilding of the display device in the operating system kernel.

In other embodiments, the drivers 230 are configured as though their corresponding GPUs 116 are each coupled to a display, and these displays have identical properties. In this case, each of the drivers 230 may be powered up or powered down, and may drive its apparently always-connected display based on higher-level policies, such as the operating condition.

In other embodiments, the computer system 200 is configured to utilize actual hot-plug switching of the GPUs 116. In this case, the dynamic switching may occur without the use of the configuration status requests 236.

In other embodiments, there may be one piece of hardware for configuring the computer system 100. For example, there may be two 3D pipelines (one of which may consume less power than the other) and a multiplexer at a head end in a common GPU integrated circuit. Or there may be one pipeline in a GPU and its power consumption and/or performance may be configured by changing clock and/or voltage signals, thereby enabling additional power and/or performance changes.

In still other embodiments, an integrated circuit may include two GPUs that share a common display engine. The display engine may have a separate memory from a buffer that holds the information to be displayed. This separate memory may be selectively coupled (for example, using a multiplexer) to the two GPUs. A speed of this display engine memory may be configured by changing clock and/or voltage signals, thereby enabling additional power savings. Furthermore, the two GPUs may utilize different transistor geometries based on the tradeoff between speed and leakage, as is known in the art.

Figure 3:
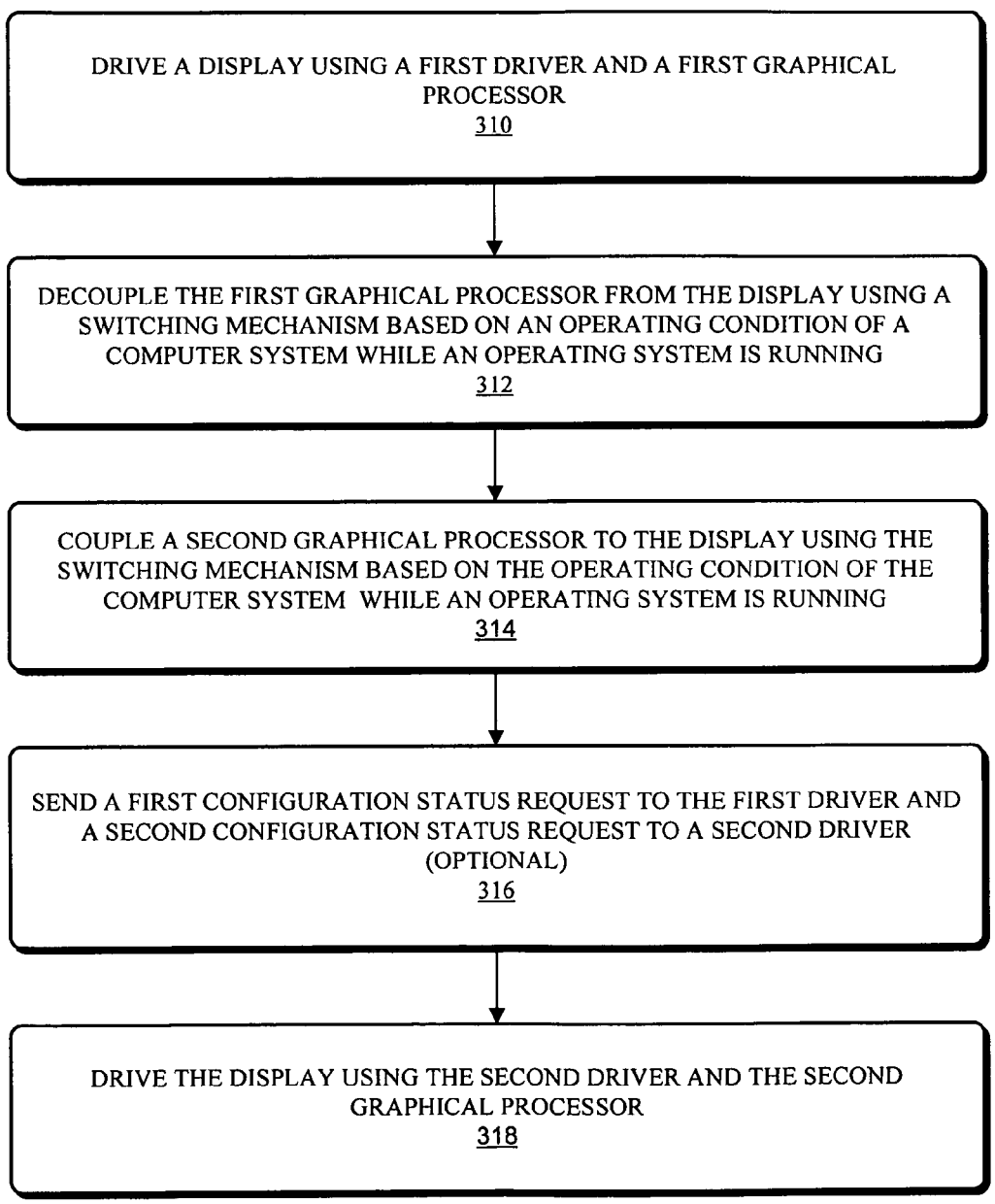
FIG. 3 is a flow chart illustrating a process for configuring a computer system in accordance with an embodiment of the present invention.

We now discuss methods for configuring computer systems. FIG. 3 provides a flow chart illustrating a process 300 for configuring a computer system in accordance with an embodiment of the present invention. During this process, a display is driven using a first driver and a first graphical processor (310), such as a GPU. Then a switching mechanism (such as a multiplexer) decouples the first graphical processor from the display (312) and couples a second graphical processor to the display (314). Note that the decoupling and coupling are based on an operating condition of a computer system (such as the computer system 100 in FIGS. 1 and 2) and are performed while the operating system is running. In some embodiments, a first configuration status request is optionally sent to the first driver and a second configuration status request is optionally sent to a second driver (316), where the second driver corresponds to the second graphical processor. Furthermore, the display is then driven using the second driver and the second graphical processor (318). In some embodiments, there may be additional or fewer operations, the order of the operations may be changed, and two or more operations may be combined into a single operation.

Figure 4:
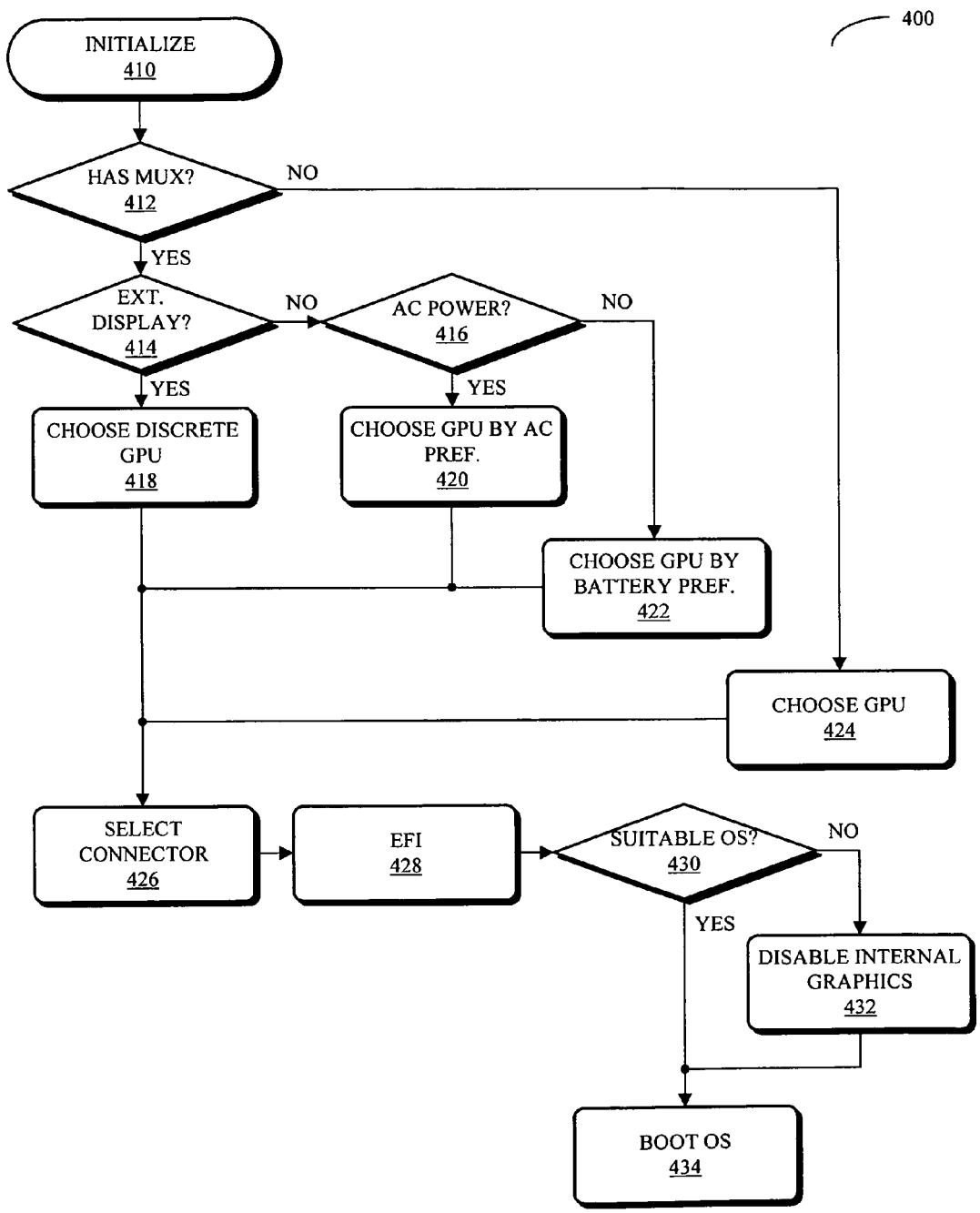
FIG. 4 is a flow chart illustrating a process for configuring a computer system in accordance with an embodiment of the present invention.

FIG. 4 provides a flow chart illustrating a process 500 for configuring a computer system in accordance with an embodiment of the present invention. This process 500 may be used to determine a GPU configuration prior to booting a computer system. After initializing (410), a presence of a switching mechanism such as a multiplexer (MUX) is determined (412). If the multiplexer (MUX) is absent, a GPU is chosen (424).

However, if the multiplexer (MUX) is present, whether or not the display is external (such as the optional display 122-2 in FIG. 1) is determined (414). If yes, a discrete GPU (such as the GPU 116-2 in FIG. 1) is selected (418). If no, whether or not AC power is available is determined (416), and the selected GPU is determined based on an AC power preference (420) or a battery power preference (422) of the user.

Once the GPU is selected, a connector is selected (426) and a BIOS Extensible Firmware Interface (EFI) is executed (428). Then whether or not the operating system supports dynamic GPU switching is determined (430). If not, the internal graphics (i.e., the GPU 116-1 in FIG. 1) is disabled (432). The computer system is then booted (434).

Figure 5:
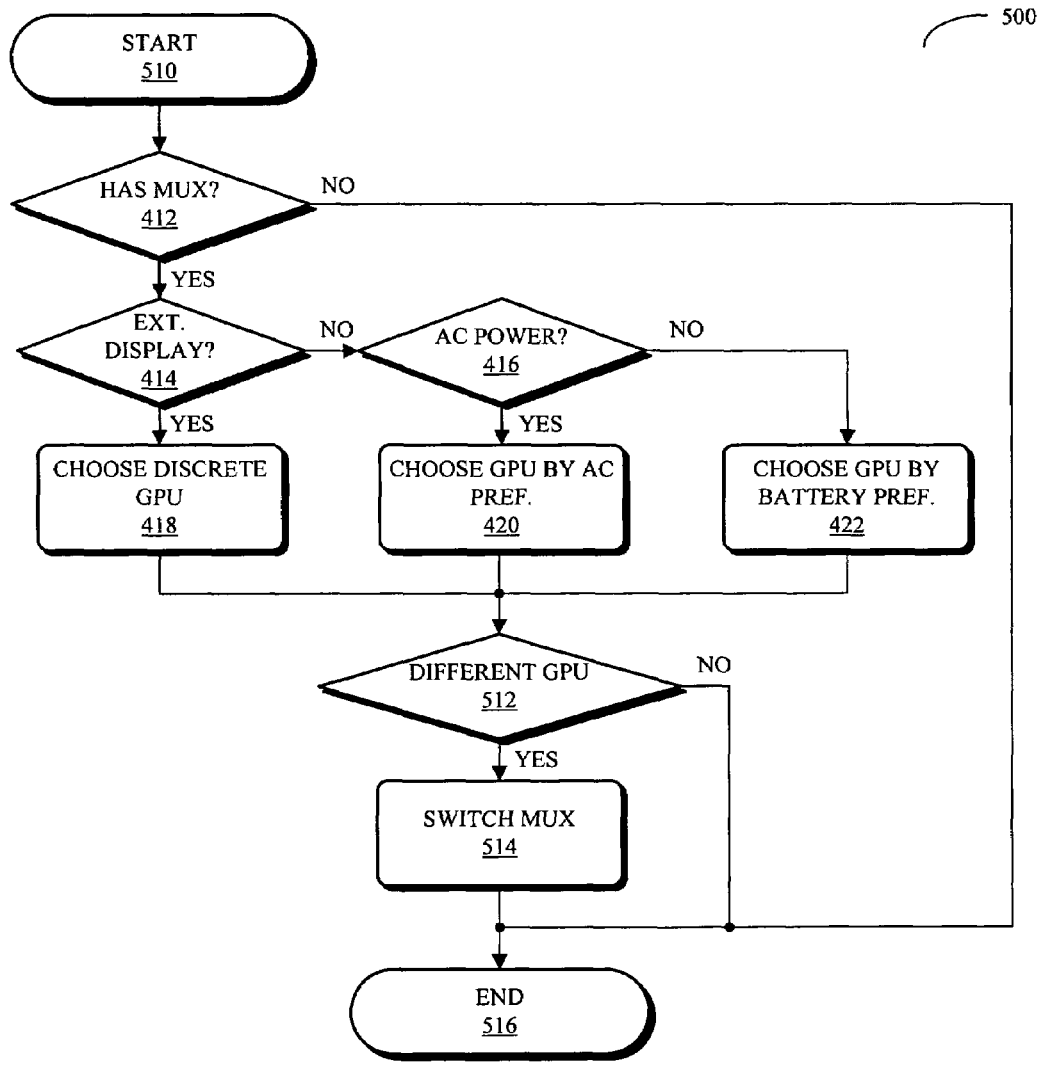
FIG. 5 is a flow chart illustrating a process for configuring a computer system in accordance with an embodiment of the present invention.
Figure 6:
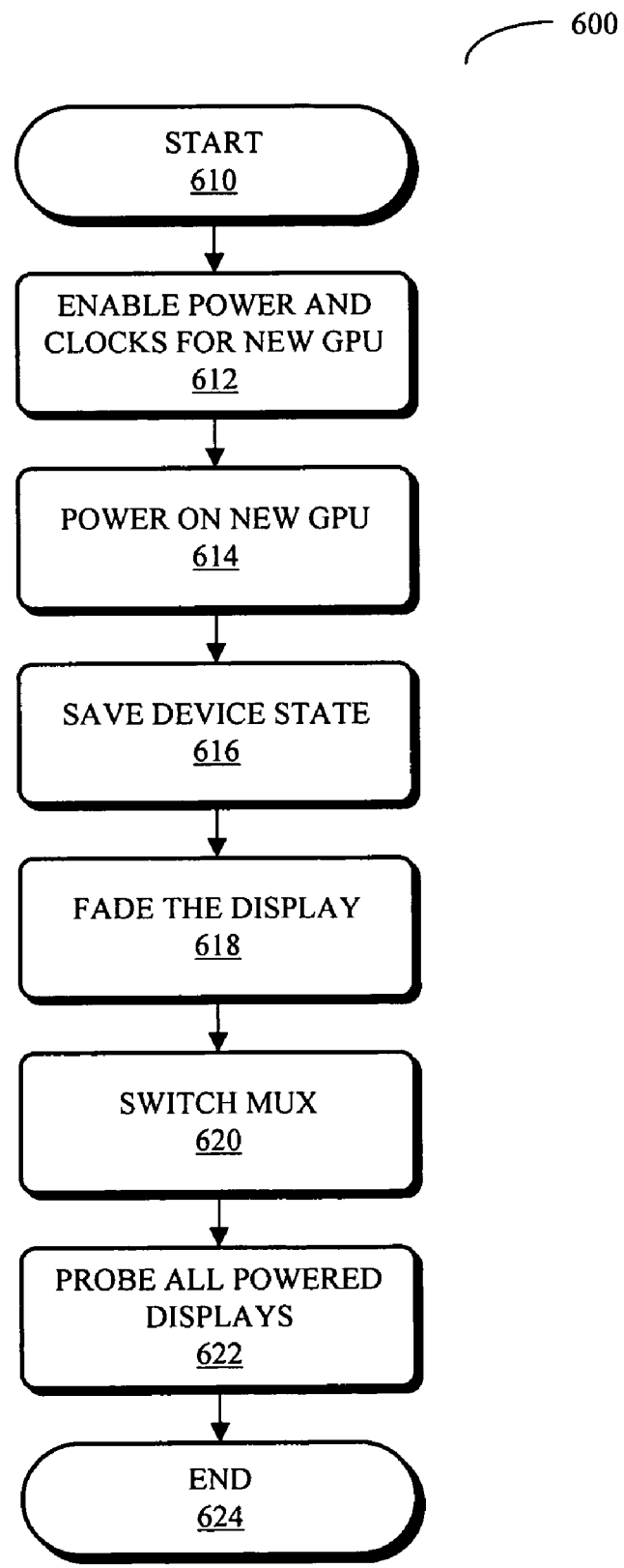
FIG. 6 is a flow chart illustrating a process for configuring a computer system in accordance with an embodiment of the present invention.
Figure 7:
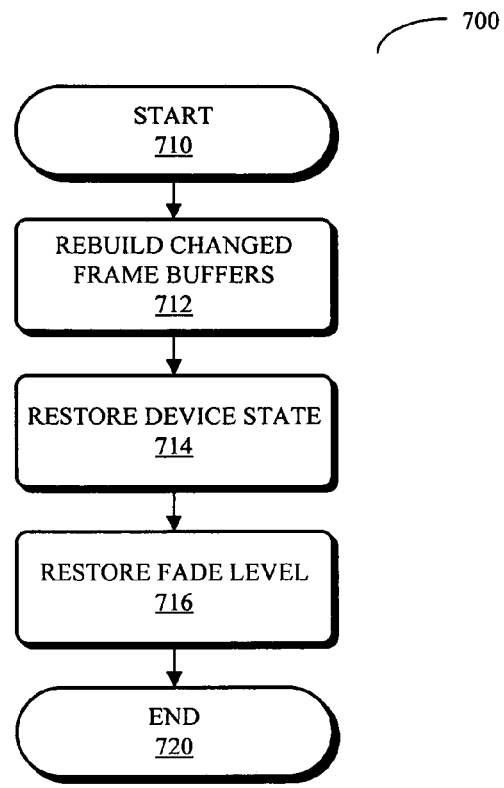
FIG. 7 is a flow chart illustrating a process for configuring a computer system in accordance with an embodiment of the present invention.

In some embodiments of the process 400, as well as in the processes described below with reference to FIGS. 5-7, there may be additional or fewer operations, the order of the operations may be changed, and two or more operations may be combined into a single operation.

After the computer has booted, detecting or determining the operating condition may result in dynamic switching of the GPUs 116 (FIGS. 1 and 2). Whether or not dynamic switching occurs may determined based on several factors. This is illustrated in FIG. 5, which provides a flow chart illustrating a process 500 for configuring a computer system in accordance with an embodiment of the present invention. After starting the process 500, a decision tree including operations 412, 414, 416, 418, 420 and 422 occurs. If a different GPU is not selected (512), the process 500 ends (516). Alternatively, the multiplexer (MUX) is switched (514).

If the GPU configuration is changed, a series of operations may be performed. These are illustrated in FIGS. 6 and 7, which provide flow charts illustrating processes 600 and 700 for configuring a computer system in accordance with an embodiment of the present invention. In process 600, a state of the multiplexer (MUX) is changed. After starting (610), power and clocks for the 'new' GPU are enabled (612) and the new GPU is powered on (614). Then a device state (i.e., the display state) is saved (616) and, in embodiments without synchronization, the 'old' GPU fades the display (618), for example, by fading the backlight of the display. After switching the multiplexer (620), all powered displays are probed (622), for example, by sending configuration status requests to display drivers for the old and new GPUs, and the process 600 ends (624).

Once the operating system is notified of the change in GPU configuration, it then rebuilds the display device in the operating system kernel using the new display environment (including the new GPU and its corresponding display driver). This is illustrated in embodiment 700. After starting (710), the changed frame buffers are rebuilt (712). Then the cross-device state (i.e., the stored display state) is restored (714) and, in embodiments without synchronization, the fade level of the backlight is restored (716). The process 700 then ends (718).

Figure 8:
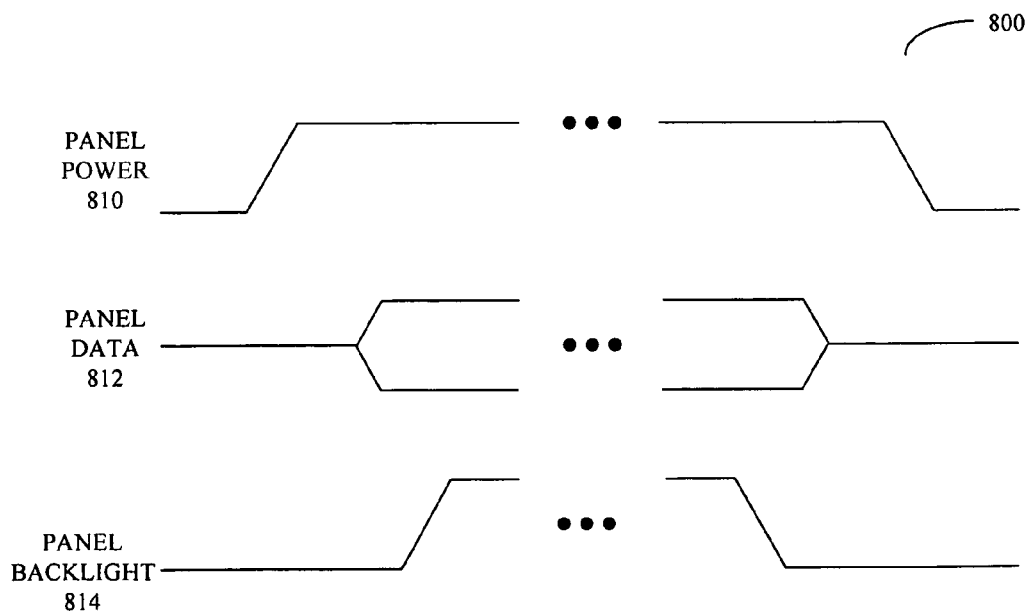
FIG. 8 is a block diagram illustrating a display signal timing sequence in accordance with an embodiment of the present invention.

We now discuss adjusting backlight of the display in embodiments that do not include synchronization. FIG. 8 provides a block diagram illustrating a display signal timing sequence in accordance with an embodiment 800 of the present invention. After the GPU configuration has been changed, panel power 810 is ramped up and panel data 812 are provided by the new GPU. Once the screen is redrawn, panel backlight 814 is increased. If the GPU configuration is to be changed at a later time, the various signals can be decreased or ramped down in reverse order.

In some embodiments, the old GPU blanks the display (displays black or another color, turns the backlight off, and/or turns the display off) prior to the dynamic switching. While this approach may not be smooth or continuous (the switching may be visible to the user), it can be done in a fraction of a second. In other embodiments, the dynamic switching may be performed over a longer time interval. For example, it may be disguised as a visual effect as the panel backlight 814 is slowly faded in or out.

Figure 9:
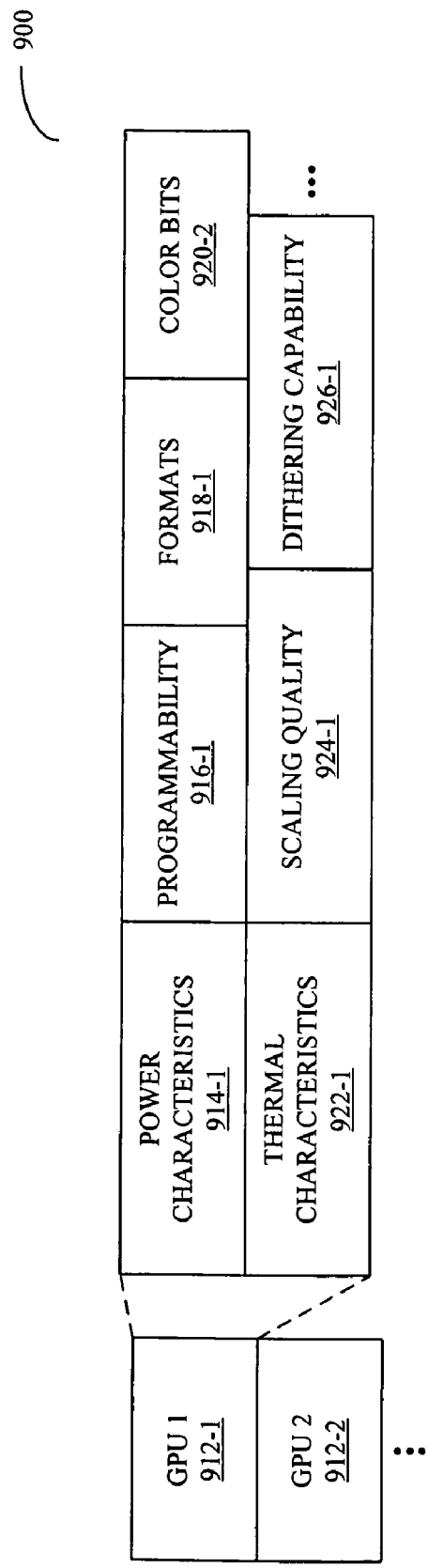
FIG. 9 is a block diagram illustrating a data structure that includes GPU operating characteristics in accordance with an embodiment of the present invention.

We now discuss embodiments of a data structure that includes operating characteristics of the GPUs. This data structure may be used by the power management module 240 (FIG. 2) in determining when to change the GPU configuration. FIG. 9 provides a block diagram illustrating a data structure 900 that includes GPU operating characteristics in accordance with an embodiment of the present invention. The data structure 900 includes entries for two or more GPUs 912. A respective entry, such as that for GPU 912-1, may include power characteristics 914-1, programmability 916-1, format processing capability 918-1, a number of color bits 920-1, thermal characteristics 922-1, scaling quality 924-1, and/or dithering capability 926-1. In some embodiments, there may be fewer components or additional components, two or more components may be combined into a single component, and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system, comprising:

a processor;

a memory;

a first graphical processor;

a second graphical processor, wherein the first graphical processor and the second graphical processor have different operating characteristics;

a switching mechanism coupled to the first graphical processor and the second graphical processor; and a display coupled to the switching mechanism, wherein the switching mechanism is configured to couple a given graphical processor to the display, and wherein the switching mechanism is initially configured to couple the first graphical processor to the display;

wherein a program module that is stored in the memory and configured to be executed by the processor is further configured to change a configuration of the switching mechanism thereby decoupling the first graphical processor from the display and coupling the second graphical processor to the display based on an operating condition of the computer system, and wherein the program module further includes instructions for storing a first display state when the first graphical processor is coupled to the display, and instructions for initializing a second display state based on the stored first display state when the second graphical processor is coupled to the display; and wherein the changing and switching module operations are configured to occur while an operating system is running.

2. The computer system of claim 1, wherein the program module further includes:

instructions for a first driver for the first graphical processor;

instructions for a second driver for the second graphical processor;

instructions for changing the configuration of the switching mechanism thereby decoupling the first graphical processor from the display and coupling the second graphical processor to the display; and instructions for a switching module that when executed by the processor:

sends a first configuration status request to the first driver that causes the first graphical processor to detect the change in the configuration and sends a second configuration status request to the second driver that causes the second graphical processor to detect the change in the configuration;

receives the detected change in configuration from the first driver and the second driver; and rebuilds a display device in the operating system based on the change in configuration.

3. The computer system of claim 1, wherein the first graphical processor is provided by a first vendor and the second graphical processor is provided by a second vendor.

4. The computer system of claim 1, wherein the program module further includes instructions for powering down the first graphical processor after decoupling the first graphical processor from the display.

5. The computer system of claim 1, wherein the program module further includes instructions for powering up the second graphical processor prior to coupling the second graphical processor to the display.

6. The computer system of claim 1, wherein the program module further includes instructions for operating the first graphical processor and the second graphical processor concurrently.

7. The computer system of claim 1, wherein the program module further includes instructions for sending rendering commands to the first graphical processor and the second graphical processor concurrently.

8. The computer system of claim 1, wherein the decoupling corresponds to a first hot-plug event and the coupling corresponds to a second hot-plug event, and wherein a given hot-plug event results from a change in a hardware configuration of the computer system.

9. The computer system of claim 1, wherein the program module further includes instructions for an application.

10. The computer system of claim 9, wherein the decoupling and coupling are configured to occur while the operating system and the application are running.

11. The computer system of claim 1, wherein the program module further includes instructions for maintaining the coupling of the display to the first graphical processor if an operating system or the application are unable to accommodate dynamic switching from the first graphical processor to the second graphical processor.

12. The computer system of claim 1, wherein the operating condition includes a hot-plug event in which a hardware configuration of the computer system is modified.

13. The computer system of claim 1, wherein the operating condition further comprises at least one of:
   a power condition of the computer system;
   a thermal condition of the computer system;
   locations of the graphical processors;
   a level of graphical processing activity; and
   a length of a work queue at an input to the first graphical processor.

14. The computer system of claim 1, wherein the first graphical processor consumes a different amount of power than the second graphical processor.

15. The computer system of claim 1, wherein the program module further includes instructions for synchronizing display signals such that graphical output on the display is continuous during the decoupling and the coupling.

16. The computer system of claim 1, wherein the decoupling and coupling are further based on user preferences.

17. The computer system of claim 1, wherein the decoupling and coupling are further based on format processing capabilities of the first graphical processor and the second graphical processor.

18. A method for configuring a computer system, comprising:
   driving a display using a first driver and a first graphical processor;
   storing a first display state;
   decoupling the first graphical processor from the display using a switching mechanism;
   coupling a second graphical processor to the display using the switching mechanism;
   driving the display using a second driver and the second graphical processor; and
   initializing a second display state based on the stored first display state;
   wherein the decoupling and coupling are based on an operating condition of the computer system, and wherein the coupling and decoupling occur while an operating system is running in the computer system.

19. A computer program product for use in conjunction with a computer system, the computer program product comprising a computer-readable storage medium and a computer-program mechanism embedded therein for configuring the computer system, the computer-program mechanism including:
   instructions for driving a display using a first driver and a first graphical processor;
   instructions for storing a first display state;
   instructions for decoupling the first graphical processor from the display using a switching mechanism;
   instructions for coupling a second graphical processor to the display using the switching mechanism;
   instructions for driving the display using a second driver and the second graphical processor; and
   instructions for initializing a second display state based on the stored first display state;
   wherein the decoupling and coupling are based on an operating condition of the computer system, and wherein the coupling and decoupling are configured to occur while an operating system is running in the computer system.

* * * * *